(12) United States Patent　(10) Patent No.: US 6,853,604 B2
Spackman et al.　(45) Date of Patent: Feb. 8, 2005

(54) SOLID MARINE SEISMIC CABLE

(75) Inventors: James Spackman, Buchanan Dam, TX (US); Mike Maples, Houston, TX (US); Gary Craig, Houston, TX (US); Louis W. Erath, Abbeville, LA (US); John Luscombe, Oxford (GB)

(73) Assignee: Sercel, Inc.

( * ) Notice: Subject to any disclaimer, the term of this patent is extended or adjusted under 35 U.S.C. 154(b) by 163 days.

(21) Appl. No.: 10/128,090

(22) Filed: Apr. 23, 2002

(65) Prior Publication Data

US 2003/0198133 A1 Oct. 23, 2003

(51) Int. Cl.$^7$ ................................................. G01V 1/38
(52) U.S. Cl. ....................... 367/154; 367/149; 367/173; 181/110
(58) Field of Search .......................... 367/20, 149, 154, 367/165, 173, 188; 181/110; 174/101.5; 114/224, 245; 118/110

(56) References Cited

U.S. PATENT DOCUMENTS

| | | | | |
|---|---|---|---|---|
| 2,465,696 A | * | 3/1949 | Paslay | ......................... 367/23 |
| 5,363,342 A | * | 11/1994 | Layton et al. | ............... 367/149 |
| 5,600,608 A | * | 2/1997 | Weiss et al. | ................... 367/20 |
| 6,128,251 A | * | 10/2000 | Erath et al. | .................. 367/154 |
| 6,151,277 A | * | 11/2000 | Erath et al. | .................. 367/173 |
| 6,292,436 B1 | * | 9/2001 | Rau et al. | ..................... 367/149 |
| 6,483,775 B1 | * | 11/2002 | Spackman et al. | ............. 367/19 |
| 6,614,723 B2 | * | 9/2003 | Pearce et al. | ................ 367/154 |

* cited by examiner

*Primary Examiner*—Nelson Moskowitz
(74) *Attorney, Agent, or Firm*—Office of Tim Cook P.C.

(57) ABSTRACT

A support structure for piezoelectric elements in a marine seismic cable is provided. The support structure comprises upper and lower cylindrical halves, each with channels formed therein. Two axial channels are adapted to retain three piezoelectric elements each. A third axial channel, positioned between the sensor element channels, is adapted to retain a flexible circuit. Transverse channels between the sensor element channels and the circuit channels accommodate extension from the flexible circuit. The piezoelectric elements are mounted within their respective channels with a resilient pad with adhesive on both sides. The piezoelectric elements are graded so that any group of three piezoelectric elements exhibits approximately the same sensitivity as any of the other three groups of piezoelectric elements on the support structure.

20 Claims, 2 Drawing Sheets

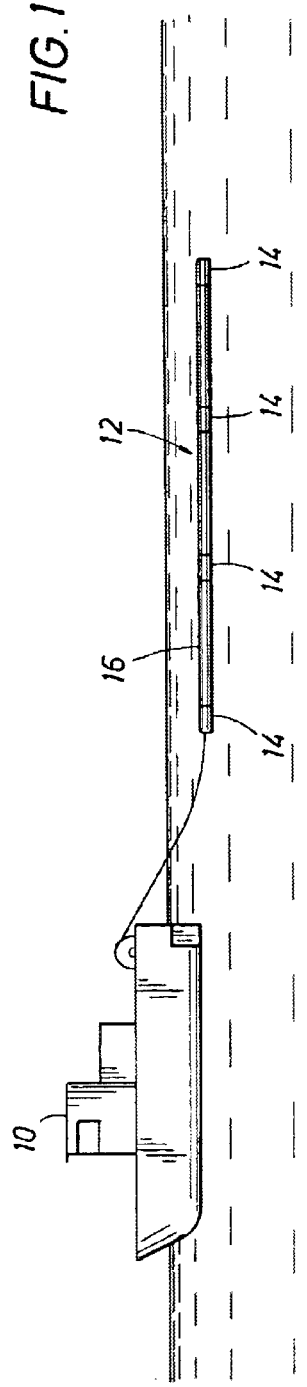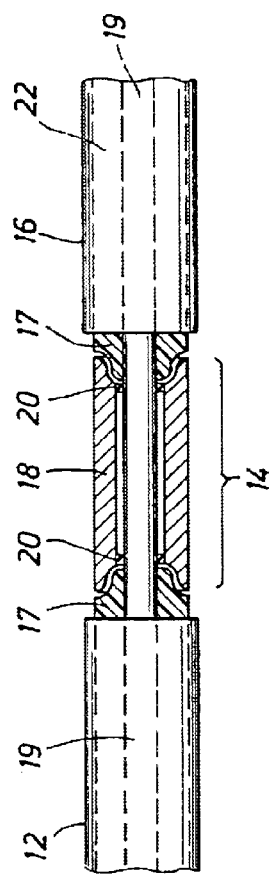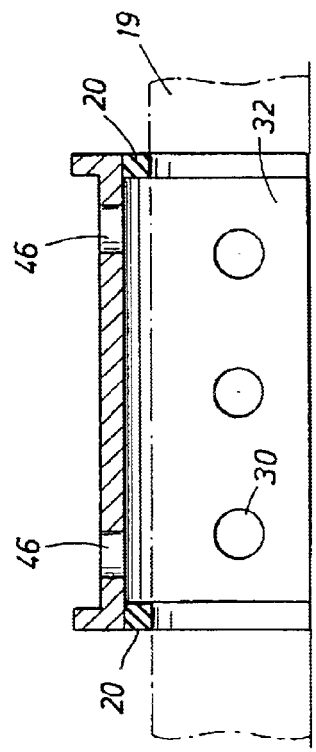

SOLID MARINE SEISMIC CABLE

FIELD OF THE INVENTION

The present invention relates generally to the field of seismic streamers which are towed through water behind vessels for seismic exploration, and, more particularly, to the field of non-fluid filled seismic streamers.

BACKGROUND OF THE INVENTION

In modem marine seismic streamer systems, a vessel tows a long cable supporting a large number of sensors. Recent developments in such systems have simultaneously focused on making them light, durable, and easy to manufacture and maintain, as well as sensitive to the acoustic signals of interest while remaining relatively immune to noise. These developments lead to improvements disclosed in U.S. Pat. No. 6,128,251, assigned to the same assignee as the present invention.

In U.S. Pat. No. 6,128,251, there was disclosed a structure of a solid marine seismic cable which included an interior cable, a surrounding woven strength member, an overlying foam floatation layer, and an enclosing jacket. One or more elongate channels were formed in the overlying floatation layer, and one or more piezoelectric elements were mounted in the channel(s). The elongate channel enlarges the acoustic aperture for improved reception of seismic signals.

Further testing of the structure disclosed in that patent proved the efficacy of the structure disclosed therein, and has resulted in certain improvements and refinements, which are the focus of the present application. More particularly, we have continued to develop the acoustic aperture of the channels disclosed in that patent, especially regarding noise and its origins and effects. We have found that, contrary to standard assumptions regarding previous liquid filled and solid marine seismic cables, noise is not uniformly distributed around the cable at the hydrophones. This discovery has lead to the development of the embodiments disclosed herein.

SUMMARY OF THE INVENTION

The present invention takes advantage of the discovery that turbulent noise in one radial direction from one point on a solid marine seismic cable may be different than the turbulent noise in another radial direction from that same point. In other words, assume for mathematical modeling purposes that a seismic cable has only one dimension, length, and has no thickness. Further assume that a hydrophone is mounted along the cable at a specific point along its length. For purposes of explanation, the term "hydrophone" as used herein refers to the plurality of piezoelectric sensor elements, coupled together in such a way as to be sensitive to acoustic pressure variations, yet insensitive to acceleration effects. Acceleration effects are typically eliminated by wiring two piezoelectric sensing elements opposite one another on either side of a mount. Further, hydrophones in a spaced apart relationship along the seismic streamer are commonly electrically coupled together in groups to enhance the total acoustic signal received.

It has been known for some time that irregularities along the cable will develop turbulent noise signals which travel down the cable from those irregularities, and modeling has assumed that the noise signals developed are different along the length of the cable. However, noise modeling in the past has also assumed that the turbulent noise at any point is uniformly distributed in a circle perpendicular to the axis of the cable.

In fact, it has been long established that the turbulent noise generated by irregularities on the surface of the streamer decays with distance from the irregularity. The rate of this decay is a function of the velocity of the streamer through the water, and of frequency. As a result, the turbulent noise sensed by a number of sensing elements in a group will not be coherent if the separation of these sensing elements is great enough, and the turbulent noise registered by such a number of piezoelectric elements connected electrically in a group will be reduced by, $$\frac{1}{\sqrt{N}},$$

wherein N is the number of such sensing elements which make up the hydrophone. The basis of the design of the present invention is the discovery that two sets of orthogonally mounted piezoelectric sensing elements behave toward noise as if they were axially separated as described above.

As previously described, U.S. Pat. No. 6,128,251 describes a structure in which a hydrophone sensor is incorporated in a solid seismic streamer. A hydrophone carrier body includes an elongated channel directly underneath the outer jacket of a marine seismic cable, piezoelectric sensor elements are mounted in the channel, and the channel is filled with a potting material. The elongated channel with the potting material enlarges the acoustic aperture of the sensor for the reception of seismic signals.

In a first aspect of the present invention, three piezoelectric elements are mounted in a channel and coupled to piezoelectric elements in one of the immediately adjacent channels. This feature reduces the effects of turbulent noise and enhances the signature to noise ratio of the hydrophone system. In operation, however, such elongated channels have been placed on either side of the cable, or radially spaced apart around the cable. Each channel has a corresponding channel directly opposite, i.e., radially spaced 180°.

In the past, multiple piczoelectric elements have been coupled together to increase the effective signal strength. Prior to installation into a marine streamer system, it has been typical to test each element, or a statistically representative sample of elements, and then simply couple the elements together electrically into sensor groups. We have found, however, that piezoelectric elements can vary from one to the other, even within design tolerances. One element may have greater sensitivity than another. With elements coupled as previously described, it is statistically possible to have one group of elements coupled together with all piezoelectric elements in the group having low sensitivity, and another group of elements all having high sensitivity, all with design specification. This can lead to aberrations in the detected seismic signal. It is therefore another feature of the present invention to grade or score the sensitivity of each hydrophone and to sort them into balanced arrays before installation into the hydrophone system of this invention. that way, the variations in hydrophone sensitivities are smoothed out for a more consistently or uniformly sensed seismic signal.

Finally, we have found that the hydrophones pick up self noise from the cable itself, in addition to the noise from outside the cable. This has always been a phenomenon that cable designers have sought to minimize, but has become even more critical with the enhanced coupling possible in a solid seismic streamer. Proposed solutions to the problem of noise conducted through the cable have included mounting hydrophones in a foam pocket within a volume of fluid such as oil in order to eliminate strain and vibration induced noises, among others. For the present design, however, we have developed a simple yet effective technique of mounting polymeric material with adhesive on both sides to the piezoelectric elements, and then mounting the piezoelectric elements into the elongated channel, forming a mechanical impedance mismatch within the hydrophone. This technique has proved to be an effective technique for decoupling the piezoelectric elements from strain and vibration passing through the cable, has been simple and inexpensive to include in a mass production process, and does not require the use of fluids.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, maybe had by reference to embodiments thereof which are illustrated in the appended drawings.

FIG. 1 is an overall schematic of a marine seismic system.

FIG. 2 is partial cutaway view of a streamer cable.

FIG. 4 is a side section view of a carrier body showing a noise isolation feature of the invention, whereby a polymeric O-ring is positioned between the carrier body and the core of the streamer cable.

DETAILED DESCRIPTION OF A PREFERRED EMBODIMENT

Figure 3:
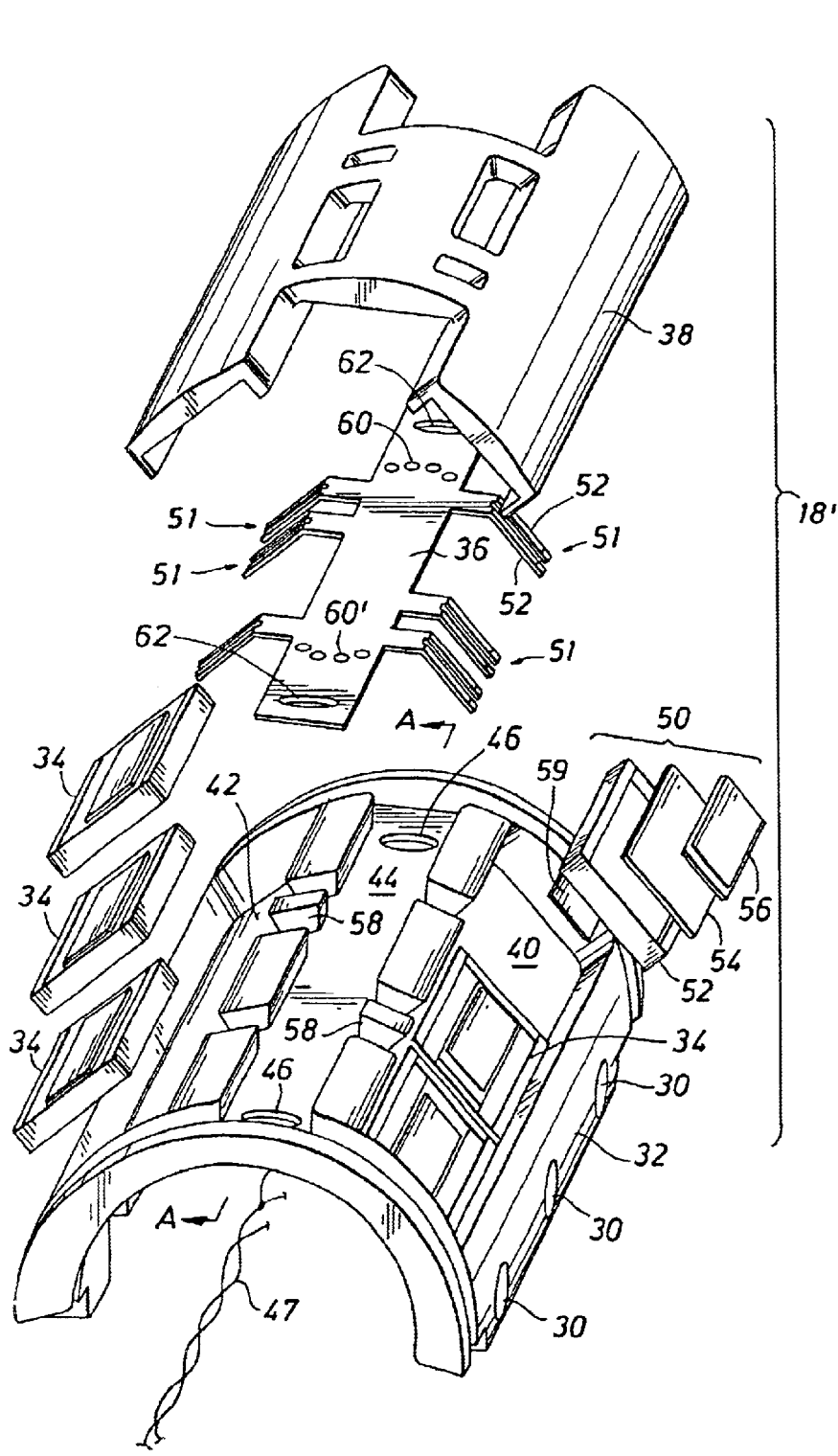
FIG. 3 is an exploded view of the sensor structure and its support.

FIG. 1 depicts a schematic of a basic marine system including a vessel 10 towing a streamer 12. The streamer has a number of pieces of auxiliary equipment, such as depth control devices, associated with it that are not shown in order to simplify FIG. 1.

The streamer 12 also includes a number of sensor components 14 spaced apart along the streamer. The sensor components and a buoyant material are sealed within a jacket 16, preferably made of polyurethane, to present a smooth profile to minimize flow noise.

FIG. 2 presents a detail view of a sensor component 14 in a segment of the streamer 12. Each of the sensor components 14 includes a carrier body 18, wherein the present invention finds application. The carrier body 18 is mechanically isolated from mechanical strain and vibrations traveling through the streamer cable by a compliant member such as a soft plastic ring 20, which may preferably be made of neoprene. The carrier body 18 and the rings 20 are covered by the jacket 16. At the portion of the streamer 12 where the sensor component 14 is located, a polymeric molding 17 on either side of the carrier body 18 extends into the opening for the sensor component 14 to provide bending support for the carrier body, for example as the cable is bent onto a reel. For the remainder of the streamer 12 which does not include a sensor component, the jacket 16 covers a foam 22 which provides a neutral buoyancy for the streamer. The foam 22 and the polymeric molding 17 surround and enclose an inner cable member 19, which comprises one or more strength members, electrical cables, and optical fibers in a manner well known in the art.

During seismic exploration operations, the vessel 10 tows many cables in an array behind the vessel. A sound signal is set off and return signals, reflected by subterranean anomalies which may indicate the presence of hydrocarbon bearing strata, are received by sensor components 14. Since the return signals are so attenuated, they may be masked by noise. The present invention improves the quality of the data so received by reducing the effects of such noise.

An upper half 18' of a carrier body 18 is shown in FIG. 3. A complementary lower half joins to the upper half 18', but is omitted from FIG. 3 for clarity. The lower half joins to the upper half, for example, with screw which are inserted into screw holes 30 in a support frame 32. The support frame 32 is preferably formed of a lightweight but stiff and strong material, such as aluminum, although other materials of sufficient strength and stiffness may be used. The support frame may be machined from a cylindrical workpiece, or case, or formed by any appropriate method.

The other major components of the carrier upper half 18' include a number of piezoelectric elements 34, preferably six such piezoelectric elements in the embodiment depicts in FIG. 3; a flexible circuit 36; and potting filler 38. The flexible circuit is preferably formed on a flexible plastic substrate such as Kapton or Mylar which are flexible. Kapton and Mylar are trademarks. The piezoelectric elements 34 are electrically coupled together in a manner to be described below so that the sensor component 14 comprises a hydrophones.

The support frame 32 has formed therein a first sensor element channel 40 and a second sensor channel 42. Each of the sensor channels 40 and 42 is sized to retain three piezoelectric elements 34. In between the sensor element channels 40 and 42 is a circuit channel 44 which is adapted to receive the flexible circuit 36. Formed at the ends of the circuit channels are cable access holes 46, only one of which provides a through-hole for connection between the piezoelectric elements and the conductors beneath the carrier bodies, but one such access hole 46 is provided so that the carrier upper half 18' can be installed on the cable in either direction. This simplifies manufacturing assembly of the various components. Alternatively, any appropriate through-access or passage large enough to accommodate the conductors may be used. The access holes 46 provide a means for connecting to electrical conductors 47 in the streamer cable.

As previously described, the carrier upper half 18' preferably retains six piezoelectric elements 34. Together, the piezoelectric elements mounted in the carrier upper half and a like number mounted in a corresponding carrier lower half, a total of twelve such elements in the embodiment of FIG. 3, make up a hydrophone, although more or fewer such elements may be used. One such element, designated with the numeral 50 to distinguish it from other piezoelectric elements 34, is shown in FIG. 3 in an exploded view for purposes of explanation. The element 50 includes supporting structure comprising a support well 52, a cover 54, and a piezoelectric crystal 56. Other element structures may as easily be used within the scope and spirit of this invention. The element 50 is secured to the channel 40 with a resilient, polymeric noise isolation mounting pad 59, which preferably includes adhesive on both sides in order to stick to the channel 40 and to the support well 52. The mounting pad 59 provides an easy way to affix the piezoelectric elements to the support carrier 18, and serves the additional purpose of absorbing noise vibration present in the cable from reaching the piezoelectric elements.

Prior to installation into the support carrier 32, each element 34 is tested for sensitivity. Piezoelectric elements which are not within design tolerances for sensitivity are discarded. Of the acceptable piezoelectric elements, some are more sensitive than others within tolerances. Each of the piezoelectric elements is graded, and the three piezoelectric elements which are then installed into a channel 40 or 42 total approximately the same total grade. This results in substantially equal sensitivity for the groups of piezoelectric elements arrayed around the support carrier 18. For example, the testing of a sample of piezoelectric elements has shown that the sensitivities of the piezoelectric elements follows a distribution curve, with the largest representative sample of the piezoelectric elements exhibiting a sensitivity at some peak of the curve. Such piezoelectric elements may be graded with a grade of zero. Piezoelectric elements with a greater sensitivity within design tolerances but above a certain value greater than the mean may be graded with a grade of +1, and piezoelectric elements with less sensitivity within design tolerances but below a certain value less than the mean may be graded with a grade of −1. The piezoelectric elements are thus coupled together for a total grade of zero, for example.

Next, groups of piezoelectric elements having the same grade are then positioned 180° apart on the support carrier. That is, a set of three piezoelectric elements is mounted on a carrier 18, and a set of three piezoelectric elements totaling the same grade is mounted on an opposite carrier half, directly opposite the other set of elements with the same grade. This way, the acceleration effects are exactly canceled for those elements. It should be noted that, although four element channels are illustrated in the drawing figures, two such element channels on each carrier half, six element channels may also be used. We have found, however, that using six element channels, with a total of 18 piezoelectric elements, does not substantially improve the signal to noise ratio of the hydrophone, and this structure is more expensive to make. Also, the structure with six element channels, although within the scope and spirit of the invention, results in less material between adjacent element channels, thereby weakening the structure.

Once the piezoelectric elements are installed, the flexible circuit 36 is inserted into the circuit channel 44. The flexible circuit 36 preferably has six tines 51, each tine having two prongs 52. Two prongs are used to couple to the positive and the negative poles of the piezoelectric crystals 56. Each tine fits into a transverse channel 58 running between the circuit channel 44 and either the element channel 40 or the element channel 42. The flexible circuit also includes eight contact pads 60, including two ground pads and one pad for each of the piezoelectric elements. The flexible circuit also includes through-holes 62 which register with the access holes 46 in the carrier upper half 18'.

Once the flexible circuit 36 has been installed and conductors soldered to the contact pads 60, the channels 40, 42, 44, and 58, are filled in with an appropriate potting material 38. The sound transmissive potting material such as neoprene rubber or other material, acts to increase the acoustic aperture of the hydrophones, conducting the seismic signal throughout the channel 40.

FIG. 4 depicts yet another feature of the invention, wherein an additional sound barrier is positioned between the cable and the acoustically sensitive components of the system. As previously described, a support frame 32 is provided to retain the piezoelectric elements, flexible circuit, potting material, and other components just described. Also, the conductors 47, strength element(s), optical fibers, and the like, together form a core 19 of the cable, shown in FIG. 4 in phantom. In order to shield noise from the core 19 from reaching the support frame, a pair of polymeric noise insulation rings 20 are disposed between the support frame and the core. The rings 20 are preferably formed of neoprene or other appropriate material which presents a high impedance at the appropriate frequencies.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A hydrophone support in a marine seismic cable, the cable including a plurality of signal carrying conductors, the support comprising:
   a. upper and lower cylindrical support body halves;
   b. a plurality of piezoelectric elements, wherein each of the plurality of piezoelectric elements is graded in respect of sensitivity, wherein piezoelectric elements are grouped together according to grade;
   c. a pair of elongated sensor element channels in each of the support body halves, each of the pair of sensor element channels adapted to retain a first subset of the plurality of piezoelectric elements;
   d. an access for electrically coupling the first subset of piezoelectric elements to a signal carrying conductor; and
   e. a mounting pad between each of the first subset of piezoelectric elements and its respective channel.

2. The support of claim 1, wherein a first group of piezoelectric elements having a grade is mounted on the hydrophone support at a position 180° opposite a second group of piezoelectric elements having substantially the same grade.

3. The support of claim 1, further comprising an elongated circuit channel between the pair of sensor element channels.

4. The support of claim 1, further comprising acoustically transparent potting material filling the pair of sensor element channels.

5. The support of claim 3, further comprising acoustically transparent potting material filling the pair of sensor element channels and the circuit channel.

6. The support of claim 3, further comprising a flexible circuit in the circuit channel, the flexible circuit extending into the sensor element channels.

7. The support of claim 1, further comprising at least one polymeric ring between the support body halves and the conductors.

8. A marine seismic cable comprising:
   a. a cable interior including a plurality of electrical conductors;
   b. a carrier body comprising:
      i. an upper half cylinder and a lower half cylinder coupled together around the cable interior;
      ii. a pair of elongated sensor element channels formed in each of the upper half cylinder and the lower half cylinder;
      iii. a plurality of piezoelectric sensor elements mounted in each sensor element channel, the piezoelectric sensor elements in each sensor element channel coupled together to form a group;
      iv. an elongated circuit channel between the sensor element channels; and
      V. a flexible circuit in the circuit channel and extending into each of the sensor element channels.

9. The cable of claim 8, further comprising a potting material filling the sensor element channels and the circuit channel.

10. The cable of claim 8, further comprising a noise isolation mounting pad on each of the piezoelectric elements.

11. The support of claim 8, wherein each of the plurality of piezoelectric elements is graded in respect of sensitivity, and wherein piezoelectric elements are grouped together according to grade and a first group of piezoelectric elements having a grade is mounted on the hydrophone support at a position 180° opposite a second group of piezoelectric elements having substantially the same grade.

12. The cable of claim 8, further comprising transverse channels between the circuit channel and the sensor element channels.

13. The cable of claim 12, wherein the flexible circuit extends into the sensor element channels through the transverse channels.

14. The cable of claim 12, wherein the flexible circuit includes a plurality of prongs, each prong comprising a pair of tines, and the prongs extending into the sensor element channels.

15. The cable of claim 8, further comprising at least one polymeric ring between the carrier body and the cable interior.

16. A hydrophone support in a marine seismic cable, the cable including a plurality of signal carrying conductors, the support comprising:
   a. upper and lower cylindrical support body halves;
   b. a plurality of piezoelectric elements;
   c. first and second elongated sensor element channels in the upper support body half, the first and second elongated sensor element channels adapted to retain first and second subsets of the plurality of piezoelectric elements;
   d. an access for electrically coupling the piezoelectric elements to a signal carrying conductor; and
   e. wherein each of the subsets of piezoelectric elements is graded in respect of sensitivity, and wherein piezoelectric elements are grouped together according to grade, and wherein subsets of piezoelectric elements having the same grade are mounted 180° opposite one another on their respective support body half.

17. The cable of claim 16, further comprising a noise isolation mounting pad on each of the piezoelectric elements.

18. The cable of claim 16, further comprising a pair of polymeric rings between the support body halves and the conductors.

19. A hydrophone support in a marine seismic cable, the cable including a plurality of signal carrying conductors, the support comprising:
   a. upper and lower cylindrical support body halves;
   b. a plurality of piezoelectric elements;
   c. a pair of elongated sensor element channels in each of the support body halves, each of the pair of sensor element channels adapted to retain a first subset of the plurality of piezoelectric elements;
   d. an access for electrically coupling the first subset of piezoelectric elements to a signal carrying conductor;
   e. a mounting pad between each of the first subset of piezoelectric elements and its respective channel; and
   f. an elongated circuit channel between the pair of sensor element channels.

20. A hydrophone support in a marine seismic cable, the cable including a plurality of signal carrying conductors, the support comprising:
   a. upper and lower cylindrical support body halves;
   b. a plurality of piezoelectric elements;
   c. a pair of elongated sensor element channels in each of the support body halves, each of the pair of sensor element channels adapted to retain a first subset of the plurality of piezoelectric' elements;
   d. an access for electrically coupling the first subset of piezoelectric elements to a signal carrying conductor; and
   e. a mounting pad between each of the first subset of piezoelectric elements and its respective channel; and
   f. at least one polymeric ring between the support body halves and the conductors.

* * * * *